United States Patent
Hosono

(10) Patent No.: US 7,289,819 B2
(45) Date of Patent: Oct. 30, 2007

(54) MESSAGE DISTRIBUTION SYSTEM, SERVER, MOBILE TERMINAL, DATA STORAGE UNIT, MESSAGE DISTRIBUTION METHOD, AND MESSAGE DISTRIBUTION COMPUTER PROGRAM PRODUCT

(75) Inventor: Shizu Hosono, Tokyo (JP)

(73) Assignee: NEC Corporation, Tokyo (JP)

( * ) Notice: Subject to any disclaimer, the term of this patent is extended or adjusted under 35 U.S.C. 154(b) by 162 days.

(21) Appl. No.: 11/090,790

(22) Filed: Mar. 25, 2005

(65) Prior Publication Data

US 2005/0221802 A1 Oct. 6, 2005

(30) Foreign Application Priority Data

Mar. 31, 2004 (JP) .............. 2004/101935

(51) Int. Cl.
*H04Q 7/20* (2006.01)
(52) U.S. Cl. ................ 455/466; 455/412.1; 455/412.2; 455/414.3
(58) Field of Classification Search ............. 455/412.1, 455/414.3, 466, 412.2
See application file for complete search history.

(56) References Cited

U.S. PATENT DOCUMENTS

| | | | |
|---|---|---|---|
| 6,714,791 B2* | 3/2004 | Friedman | 455/456.1 |
| 6,785,538 B2* | 8/2004 | Nihei | 455/414.1 |
| 7,020,685 B1* | 3/2006 | Chen et al. | 709/204 |
| 2002/0026360 A1 | 2/2002 | McGregor et al. | |
| 2002/0049836 A1 | 4/2002 | Shibuya | |
| 2002/0137507 A1 | 9/2002 | Winkler | |
| 2004/0203671 A1* | 10/2004 | Fukushima | 455/414.3 |
| 2004/0229635 A1* | 11/2004 | Hertz | 455/466 |
| 2004/0266408 A1* | 12/2004 | Maes | 455/414.1 |

FOREIGN PATENT DOCUMENTS

| | | |
|---|---|---|
| JP | 2002-55933 | 2/2002 |
| JP | 2002-269010 | 9/2002 |

OTHER PUBLICATIONS

European Search Report dated Sep. 13, 2005.

* cited by examiner

*Primary Examiner*—Nick Corsaro
*Assistant Examiner*—Simon A Goetze
(74) *Attorney, Agent, or Firm*—McGinn IP Law Group PLLC

(57) ABSTRACT

A message distribution system which distributes messages for transmission/reception between mobile terminals, comprising: a message distribution server which receives a message transmitted from one of the mobile terminals and distributes the message to the mobile terminal on a receiving side; and a library server which includes: a data storage unit storing a plurality of content data corresponding to a keyword; and a control circuit which executes a search to determine matching with the keyword stored in the data storage unit by using a word contained in a body of the message as a key upon a request from one of the message distribution server and the mobile terminal; extracts, when the word matches the keyword, all content data corresponding to the keyword from the data storage unit, and extract content data similar to predetermined condition information from the extracted content data; and embeds the extracted content data similar to the condition information in the message.

28 Claims, 14 Drawing Sheets

| KEYWORD | CONTENT DATA | USE CONDITIONS FOR USER ||||| 
|---|---|---|---|---|---|---|
| | | SEX | AGE | OCCUPATION | HOBBY | ... |
| | | | | | | |
| | | | | | | |
| | | ⋮ | ⋮ | ⋮ | ⋮ | |
| | | | | | | |
| | | | | | | |
| | | ⋮ | ⋮ | ⋮ | ⋮ | |

FIG.12

| USER ID | KEYWORD | CONTENT DATA | USE TIME |
|---|---|---|---|
| | | | |
| | | | |
| | | ⋮ | ⋮ |
| | | | |
| | | ⋮ | ⋮ |

FIG.13

MESSAGE DISTRIBUTION SYSTEM, SERVER, MOBILE TERMINAL, DATA STORAGE UNIT, MESSAGE DISTRIBUTION METHOD, AND MESSAGE DISTRIBUTION COMPUTER PROGRAM PRODUCT

BACKGROUND OF THE INVENTION

1. Field of the Invention

The present invention relates to a message distribution system which distributes messages transmitted/received between mobile terminals such as mobile telephones, and more particularly to a message distribution system, a server, a mobile terminal, a data storage unit, a message distribution method, and a message distribution computer program product which enable automatic embedding of content data (image data, sound data, or the like) in a message to be transmitted from a mobile terminal.

2. Description of the Related Art

Conventionally, in a mobile telephone as a mobile terminal, it is a message (mail) transmitting/receiving function among those functions other than a conversation function, that has been in frequent use among users. The use of such message transmission/reception has been accompanied by increased cases of creating unique and tasteful messages.

Among the users who utilize the message transmission/reception, creation of unique and tasteful messages by adding content data (image data, sound data, or the like) thereto has been gaining in popularity.

During message creation, the user who creates such a message usually uses a limited number of content data (image data, sound data, or the like) prestored in a user's own mobile terminal to create the message.

In the case of creating a message by using data other than the content data (image data, sound data, or the like) prestored in the mobile terminal, each user must manually download content data (image data, sound data, or the like) from a content provider's web site.

Even when the user has embedded a content data (image input, sound input, or the like) in the message body during message creation, inputs of a text and content data necessitate an operation for selecting which is to be input. Thus, the operation is complex and takes much time and labor in the message creation.

To carry out such message creation, the user must select content data (image input, sound input, or the like) by taking into consideration whether the user's own individuality is reflected or not, whether a message is tasteful or not to a recipient, and the like.

Examples of a conventional mail distribution method include technologies are disclosed in JP 2002-55933 A and JP 2002-269010 A (hereinafter, referred to as "Documents 1 and 2", respectively).

In the mail distribution method of Document 1, the following technology is disclosed. That is, Document 1 describes a technology of prestoring content data that is previously associated with a character string on a character basis in storage means of a mail server. Additionally, Document 1 describes a technology of extracting, after a transmission source mobile terminal causes a user to select a character at the time of transmitting the mail, image data corresponding to a body of mail received by the mail server based on the character selected by the user, and embedding the extracted character in the mail. Thus, the transmission source mobile terminal does not need to select or create an image, and can embed the image data corresponding to the body of the mail and transmit the mail to a destination.

Described as the mail distribution method of Document 2 is a technology which causes a mail server to receive mail from a mail transmission terminal and to add telephone number data and map link information corresponding to position information among pieces of user information of a registered user to the electronic mail and transmit the mail. Accordingly, a transmission destination mobile terminal can start conversation with a counterpart merely by clicking the telephone number added to the mail, and obtain map information from a map information provider's web site merely by clicking the added map link information.

However, in the message mail transmission/reception of the mobile terminals described thus far, the following exemplary problems occur.

According to the conventional technology, in the case of embedding the content data (image data, sound data, or the like) in the message creation, the user must create a message by taking into consideration their own tastes, how the recipient reacts, or the like, and consequently more time and labor are necessary for the creation.

According to the method of Document 1, the content data that is previously associated with the character string on a character basis is prestored in the storage means. After the user selects the character at the time of transmitting the mail, the mail server extracts the image data corresponding to the body of the created mail based on the selected character, and embeds the extracted image data in the mail. Thus, the method of Document 1 has a problem that the user's personal information (age, occupation, and the like) are not reflected on the image data, and a problem that often the used favorite image data is not always selected automatically.

According to the method of Document 2, the user information is not processed with the contents of the message set as user information history. Therefore, a problem arises in that it is impossible to embed image data according to tastes incomprehensible at the time of user's initial registration due to changes in the transmitted message contents or according to changes of user's tastes which occur from time to time.

SUMMARY OF THE INVENTION

In view of the foregoing and other exemplary problems, and drawbacks of the conventional techniques, it is therefore an exemplary feature of the present invention to provide a message distribution system, a server, a mobile terminal, a data storage unit, a message distribution method, and a message distribution computer program product which can create a message having content data (image data, sound data, or the like) suited to user's favorites or tastes and embedded therein under conditions of user information.

It is another exemplary feature of the present invention to provide a message distribution system, a server, a message distribution method, and a message distribution computer program product enable a mobile terminal to reedit content data (image data, sound data, or the like) embedded in a message after transmission thereof.

In order to achieve the above-mentioned first exemplary feature and others, according to the present invention, there is provided a message distribution system, including: a message distribution server which receives a message transmitted from one of the mobile terminals and distributes the message to the mobile terminal on a receiving side; and a library server which includes a data storage unit storing a plurality of content data corresponding to a keyword. The library server further includes: a control circuit which executes a search to determine matching with the keyword stored in the data storage unit by using a word contained in a body of the message as a key upon a request from one of the message distribution server and the mobile terminal; extracts, when the word matches the keyword, all content data corresponding to the keyword from the data storage unit, and extract content data similar to predetermined condition information from the extracted content data; and embeds the extracted content data similar to the condition information in the message.

In order to achieve the above and other exemplary features, in the message distribution system according to the present invention, the library server further includes: the control circuit which makes a content checking request by transmitting the message having content data embedded therein to the mobile terminal upon a request from the mobile terminal; and the mobile terminal performs at least one of changing, deleting, and adding of the content data embedded in the message based on the checking request.

Further, in order to achieve the above-mentioned first exemplary feature and others, according to the present invention, there is provided a server which distributes message for transmission/reception between mobile terminals, and includes a data storage unit storing a plurality of content data corresponding to a keyword. The server further includes: a control circuit which executes a search to determine matching with the keyword stored in the data storage unit by using a word contained in a body of the message as a key; extracts, when the searcher determines that the word matches the keyword, content data corresponding to the keyword from the data storage unit, and extracts content data similar to predetermined condition information from the extracted content data; and embeds the extracted content data similar to the condition information in the message.

In order to achieve the above and other exemplary features, the server according to the present invention further includes the control circuit makes a content checking request by transmitting the message having content data embedded therein to the mobile terminal upon a request from the mobile terminal.

Further, in order to achieve the above-mentioned first and second exemplary feature and others, according to the present invention, there is provided a mobile terminal which transmit and receive a message through a server for distributing messages, comprising: a communication circuit which receives the message having content data embedded therein; and a control circuit which requests a new content data which a user desire to the server, and edits the received message base on the received new content data from the server.

Further, in order to achieve the above-mentioned first and second exemplary feature and others, according to the present invention, there is provided a data storage unit of being managed by a server which distributes messages for transmission/reception between mobile terminals, comprising: a first store area which stores a plurality of content data corresponding to a keyword for causing the server to abstract the content data base on a condition information containing at least one of a sex, an age, an occupation, and a hobby; a second store area which stores the content data embedded in the message transmitted from the mobile terminal and a keyword corresponding to the embedded content data as user information unique to each user.

Further, in order to achieve the above-mentioned first exemplary feature and others, according to the present invention, there is provided a message distribution method including: executing, in the server, a search to determine matching with a keyword stored in a data storage unit by using a word contained in a body of the message as a key in one of when the message is relayed from the mobile terminal and when a request to embed content data is received from the mobile terminal; extracting, when the word matches the keyword, all content data corresponding to the keyword from the data storage unit, and extracting content data similar to predetermined condition information from the extracted content data; and embedding, the extracted content data similar to the condition information in the message.

In order to achieve the above-mentioned first and second exemplary features and others, the message distribution method further includes: making, in the server, a content checking request by transmitting the message having content data embedded therein to the mobile terminal upon a request from the mobile terminal; and performing, in the mobile terminal, at least one of changing, deleting and adding of the content data embedded in the message based on the checking request.

Further, in order to achieve the above-mentioned first exemplary feature and others, according to the present invention, there is provided a single-bearing medium for storing a message distribution program which causes a computer to execute the processings of: executing a search for a keyword matching a word contained in a body of the message through a data storage unit storing a plurality of content data corresponding to the keyword; extracting, when the word matches the keyword, content data corresponding to the keyword from the data storage unit, and extracting content data similar to predetermined condition information from the extracted content data; and embedding the extracted content data similar to the condition information in the message.

In order to achieve the above-mentioned first and second exemplary features and others, the message distribution program further causes the computer to execute the processing of making a content checking request by transmitting the message having content data embedded therein to the mobile terminal upon a request from the mobile terminal.

According to the present invention, the message distribution system, the server, and the message distribution computer program product produce the following exemplary advantages.

In the message transmission/reception between the users, it is not necessary to carry out an operation of embedding content data (image data, sound data, or the like) during message creation. Merely by executing normal message transmission, the content data (image data, sound data, or the like) concerning the transmitted message and compliant with the user's tastes can be automatically embedded and distributed.

It is not necessary to keep the content data, which is to be embedded in the message, stored in the mobile terminal. By using content data (image data, sound data, or the like) stored in the server, it is possible to reduce a memory load in the mobile terminal.

In the case of using data other than the content data (image data, sound data, or the like) prestored in the mobile terminal, it is possible to reduce work imposed on each user for manually downloading to obtain the content data (image data, sound data, or the like) from the content provider's web site for the mobile terminal.

The mobile terminal allows reediting of the content data (image data, sound data, or the like) embedded in the message after the transmission thereof. Thus, it is impossible to embed content data compliant with the user's intention.

Furthermore, the content data selected by the user in the content data editing is managed as user information, and the content data is embedded by referring to the user information. Accordingly, it is possible to create a message having content data suitable to user's favorites and tastes embedded therein. As a result, the number of times of changing the content data is reduced when the user checks the message sent from the library server.

BRIEF DESCRIPTION OF THE DRAWINGS

These and other exemplary aspects, features, and advantages of the present invention will become more fully apparent from the following detailed description taken in conjunction with accompanying drawings. In the drawings:

FIG. 12 is a structural diagram schematically showing a structure of a data folder in a data storage unit according to the first or second exemplary embodiment of the present invention shown in FIG. 1;

FIG. 13 is a structural diagram schematically showing a structure of user information in the data storage unit according to the second exemplary embodiment of the present invention shown in FIG. 1.

DETAILED DESCRIPTION OF THE EXEMPLARY EMBODIMENTS

Hereinafter, a first exemplary embodiment of the present invention will be described in detail with reference to the accompanying drawings.

Figure 1:
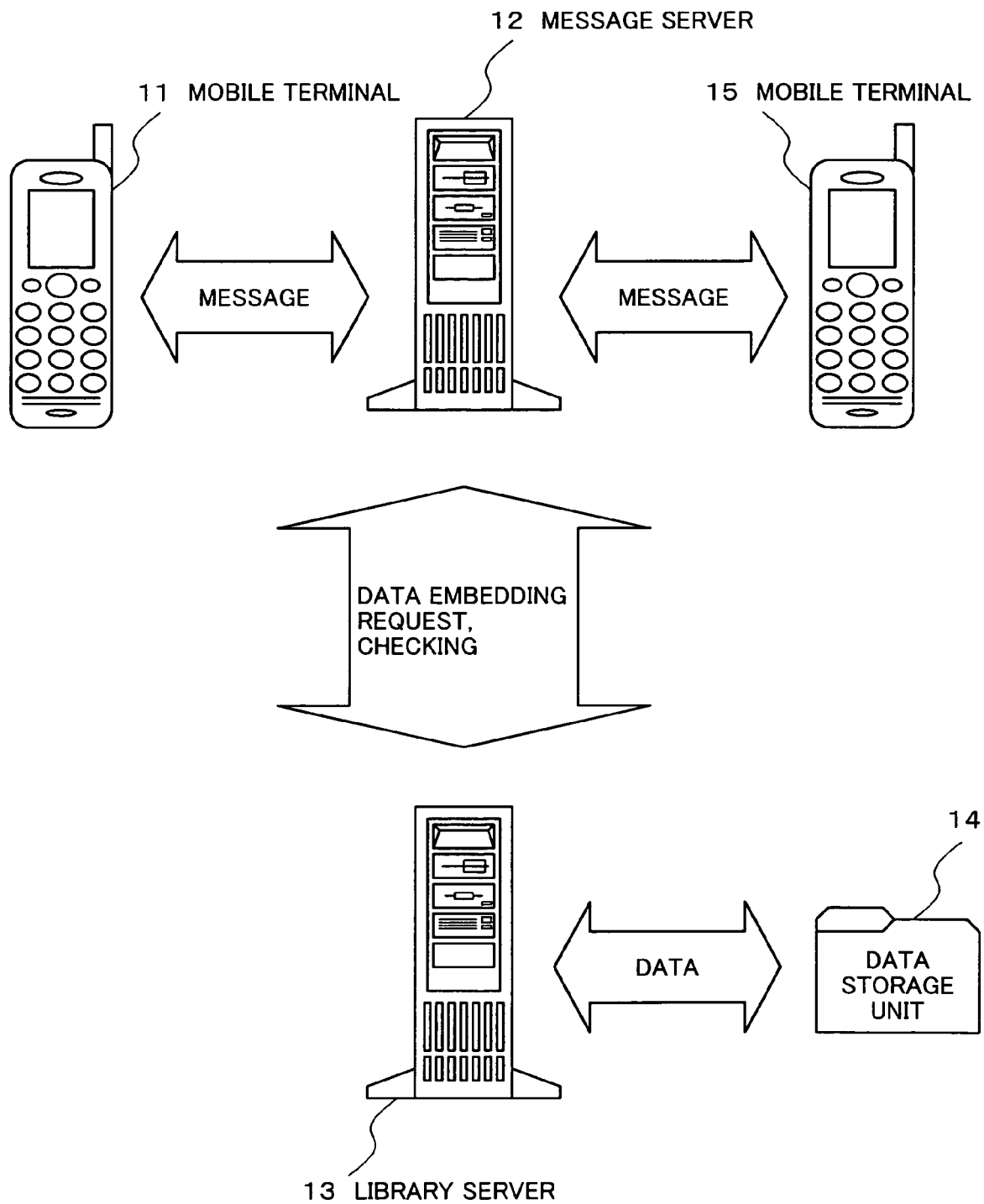
FIG. 1 is a block diagram showing an overall configuration of a system according to a first or second exemplary embodiment of the present invention.

FIG. 1 is block diagram showing a configuration of a system according to the first exemplary embodiment of the present invention. That is, the system of the present invention includes mobile terminals 11, 15, a message server 12, a library server 13, and a data storage unit 14.

Each of the mobile terminals 11, 15 is connected to the message server 12 through a radio network and a network (LAN, Internet or the like) during message transmission, and carries out data communication of messages (e.g., electronic mail) with the opposite mobile terminal through the message server 12.

The message server 12 is a computer such as a personal computer, a work station, or a server device which controls message transmission/reception for the mobile terminals 11, 15. The message server 12 includes a control circuit (not shown) which executes programs by a central processing unit, CPU (not shown). Therefore the message server 12 is operated under program control executed by the CPU. A message distribution program is installed in a memory circuit, for example, a magnetic or optical disk device (not shown) of the message server 12. The CPU of the message server 12 executes the message distribution program to control message distribution.

The library server 13 is a computer such as a personal computer, a work station, or a server device connected to the message server 12 through LAN or the like. The library server 13 includes a control circuit (not shown) which executes programs by a CPU (not shown). Therefore the library server 13 is operated under program control executed by the CPU. A message distribution program is installed in a memory circuit, for example, a magnetic or optical disk device (not shown) of the library server 13. In the case, a message distribution program may be stored into a not-shown signal-bearing medium (such as a CD, a FDD, or the like) and may be installed into a memory circuit through the mediation of a recording medium device. If the control circuit of the library server 13 executes the message distribution program, then content data stored in the data storage unit 14 is embedded in a message.

The data storage unit 14 is allocated to a certain area in a nonvolatile recording medium device, for example, a magnetic or optical disk device (not shown) connected to the library server 13. A data folder area and a user registration information area are allocated to the data storage unit 14.

In the data folder of the data storage unit 14, content data containing image data, sound data, or the like for executing embedding (described later) is stored corresponding to a keyword. The keyword in this case indicates a word which becomes a target of content data embedding. Accordingly, there are one or a plurality of content data corresponding to one keyword. In addition, in the data folder of the data storage unit 14, as suitable yardsticks for a user to use contents, use conditions for users (sex, age, occupation, hobby, and the like) are preregistered for each content data so that the library server 13 can make a determination. Users registered in the user registration information of the data storage unit 14 can utilize the data folder.

FIG. 12 schematically shows a structure of the data folder of the data storage unit 14, in this case. The structure shown in FIG. 12 includes content data and user use conditions for each keyword.

Further, as shown in FIG. 12, the user use conditions contain sex, age, occupation, hobby, and the like. Regarding the sex, a sex (male or female, or male, female) corresponding to the content data is registered. Regarding the age, an age range (e.g., 16 to 30) corresponding to the content data is registered. Regarding the occupation, an occupation name (all occupation names if there are plural ones) corresponding to the content data is registered. Regarding the hobby, a hobby (all hobby names if there are plural ones) corresponding to the content data is registered.

There is user registration information stored in the data storage unit 14. The user registration information in this case is information registered at the time of user registration. For each user ID, a user name, an address, a sex, occupation, an age, and the like are registered.

The first exemplary embodiment is directed to an example of message transmission/reception between the mobile terminals 11 and 15. In this case, each of the mobile terminals 11, 15 is a portable mobile terminal such as a mobile telephone, a personal handy phone system (PHS), a personal digital assistant (PDA), or a notebook computer.

Each of the mobile terminals 11, 15 is operated under the program control by the CPU. Each of the mobile terminals 11, 15 transmits/receives a message containing image data or sound data with the opposite mobile terminal through the message server under the program control by the CPU.

Figure 2:
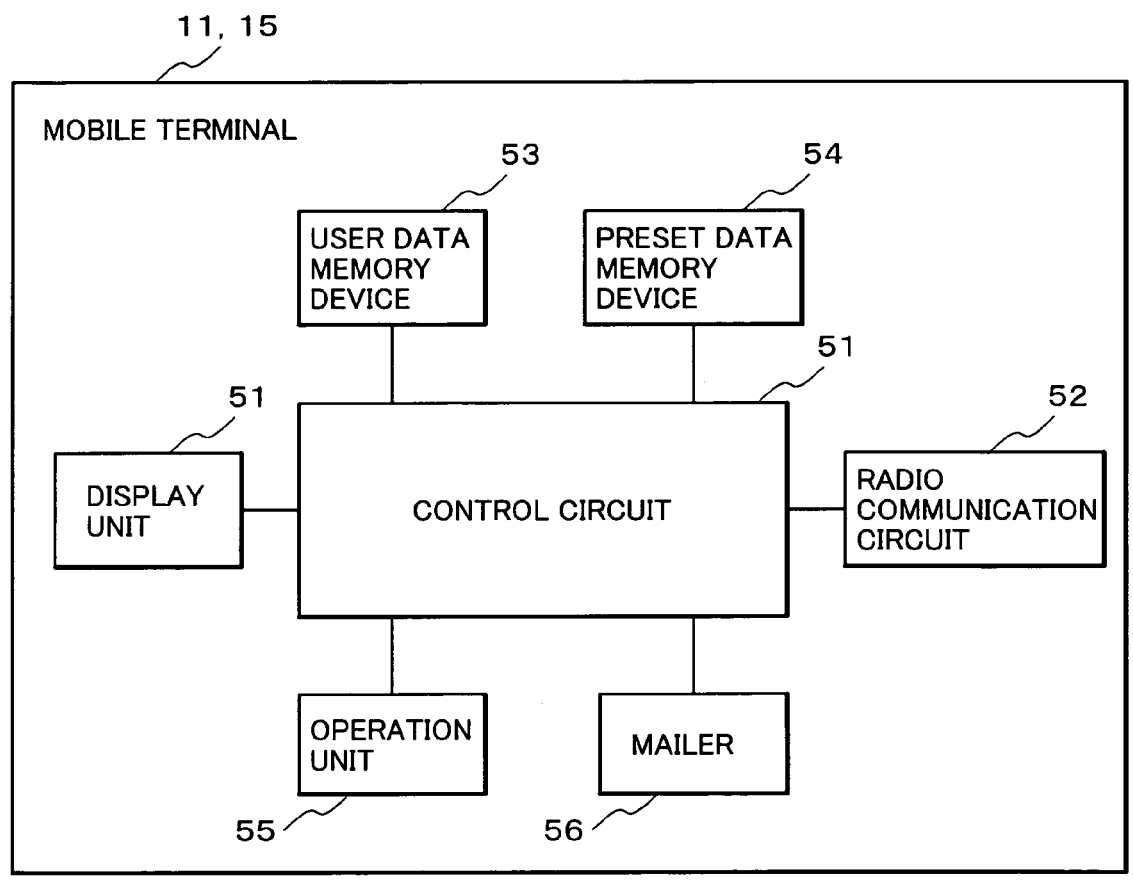
FIG. 2 is a block diagram showing a configuration of a mobile terminal according to the first exemplary embodiment of the present invention shown in FIG. 1.

FIG. 2 shows an internal configuration common to the mobile terminals 11, 15 which can transmit/receive messages.

Each of the mobile terminals 11, 15 includes a control circuit 51 which controls each circuit, a mailer 56, a radio communication circuit 52, a user data memory device 53, a preset data memory device 54, an operation unit 55, and a display unit 59.

The control circuit 51 is operated under program control by the CPU (not shown) to control the entire mobile terminal. That is, the control circuit 51 is a circuit operated under the program control when the CPU executes various programs including the mailer 56.

Under the control circuit 51, the radio communication circuit 52 communicates with the other device (message server 12, opposite mobile terminal, or the like) through a radio network. When a message created by the user is transmitted, the radio communication circuit 52 transmits the message by an instruction from the control circuit 51.

The user data memory device 53 and the preset data memory device 54 are allocated to certain areas in a non-volatile memory circuit (e.g., flash memory or the like) incorporated in the mobile terminal. In the user data memory device 53, photographs or data manually downloaded by each user are stored. In the preset data memory device 54, image data or sound data prestored in the mobile telephone are stored.

The operation unit 55 includes a numeric keypad or the like to input data for the mobile terminal, and notifies the control circuit 51 of data input by using the keys or the like.

The mailer 56 is a mail program stored in the memory circuit, for example, a flash memory (not shown) to create messages or to transmit/receive messages. When the user starts the mailer 56 by using the operation unit 55, the control circuit 51 executes an operation of creating a message or transmitting/receiving a message according to input information from the operation unit 55.

The display unit 59 is a display (e.g., liquid crystal display) mounted to the terminal, which displays a message, an image, or the like created under the control of the control circuit 51.

At the mobile terminal 11 or 15 that has received the message, the user starts the mailer 56 by using the operation unit 55 and opens the received message. Then, the control circuit 51 causes the display unit 59 to display a text body input by a message transmitter and image data automatically embedded by the library server 13, and simultaneously outputs a melody through a built-in speaker (not shown) based on the embedded sound data.

Figure 3:
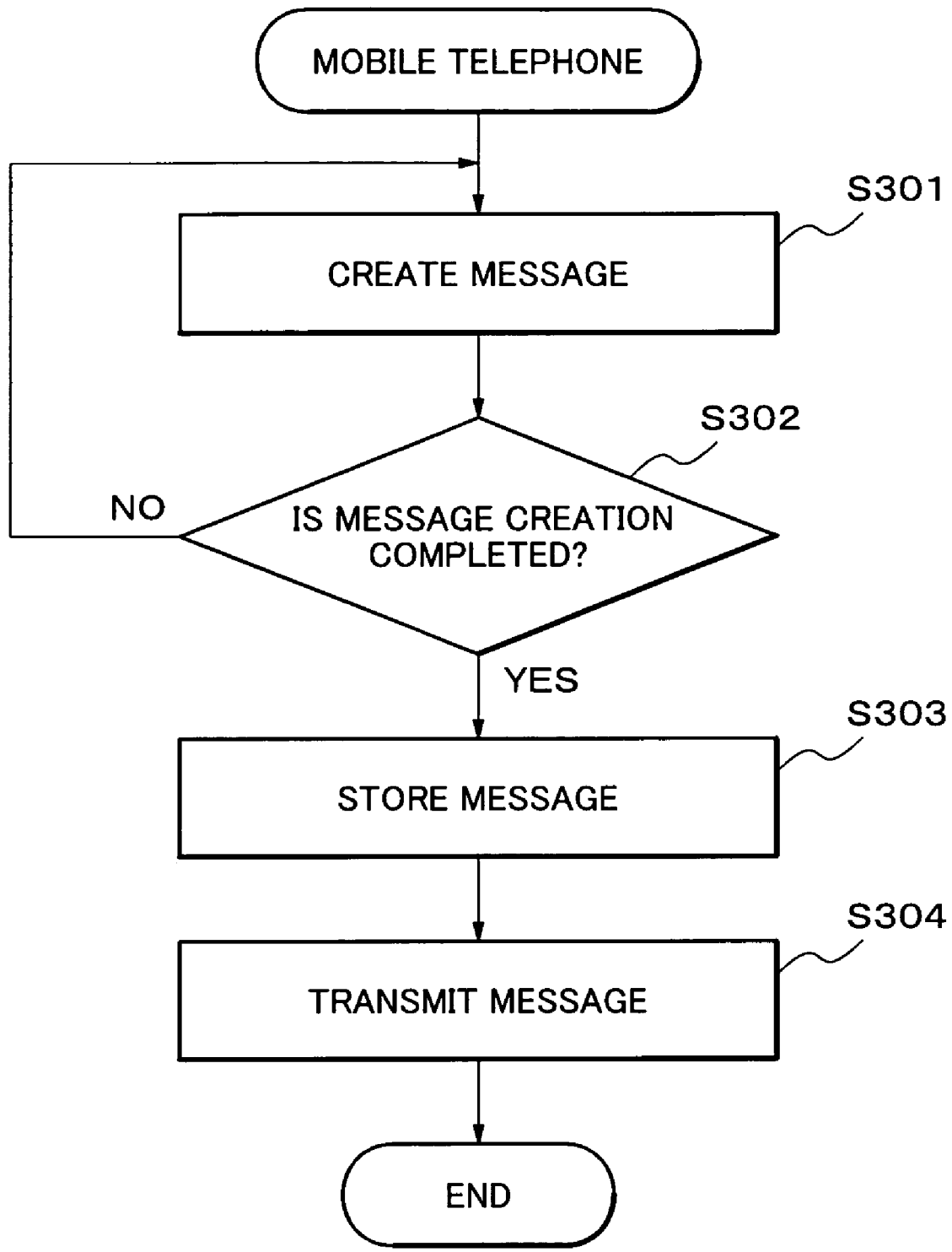
FIG. 3 is a flowchart illustrating an operation of the mobile terminal during message transmission according to the first exemplary embodiment of the present invention shown in FIG. 1.

Now, referring to FIGS. 3 to 5, description will be made of operations of the mobile terminals 11, 15, the mail server 12, and the library server 13 of the first exemplary embodiment constituted in the aforementioned manner.

First, referring to a flowchart of FIG. 3, description will be made of an operation when the mobile terminal 11 transmits a message to the mobile terminal 15.

At the mobile terminal 11, to send a message to the opposite mobile terminal, the user starts the mailer 56 and selects mail creation on a menu screen. Then, the control circuit 51 of the mobile terminal 11 causes the display unit 59 to display a screen 101 of new message creation of FIG. 14, whereby the user creates a message (step S301 of FIG. 3). In this case, the message creation is carried out in a manner that the user inputs a message destination on the screen 101 of new message creation from the operation unit 55, and subsequently inputs a body in text.

Figure 14:
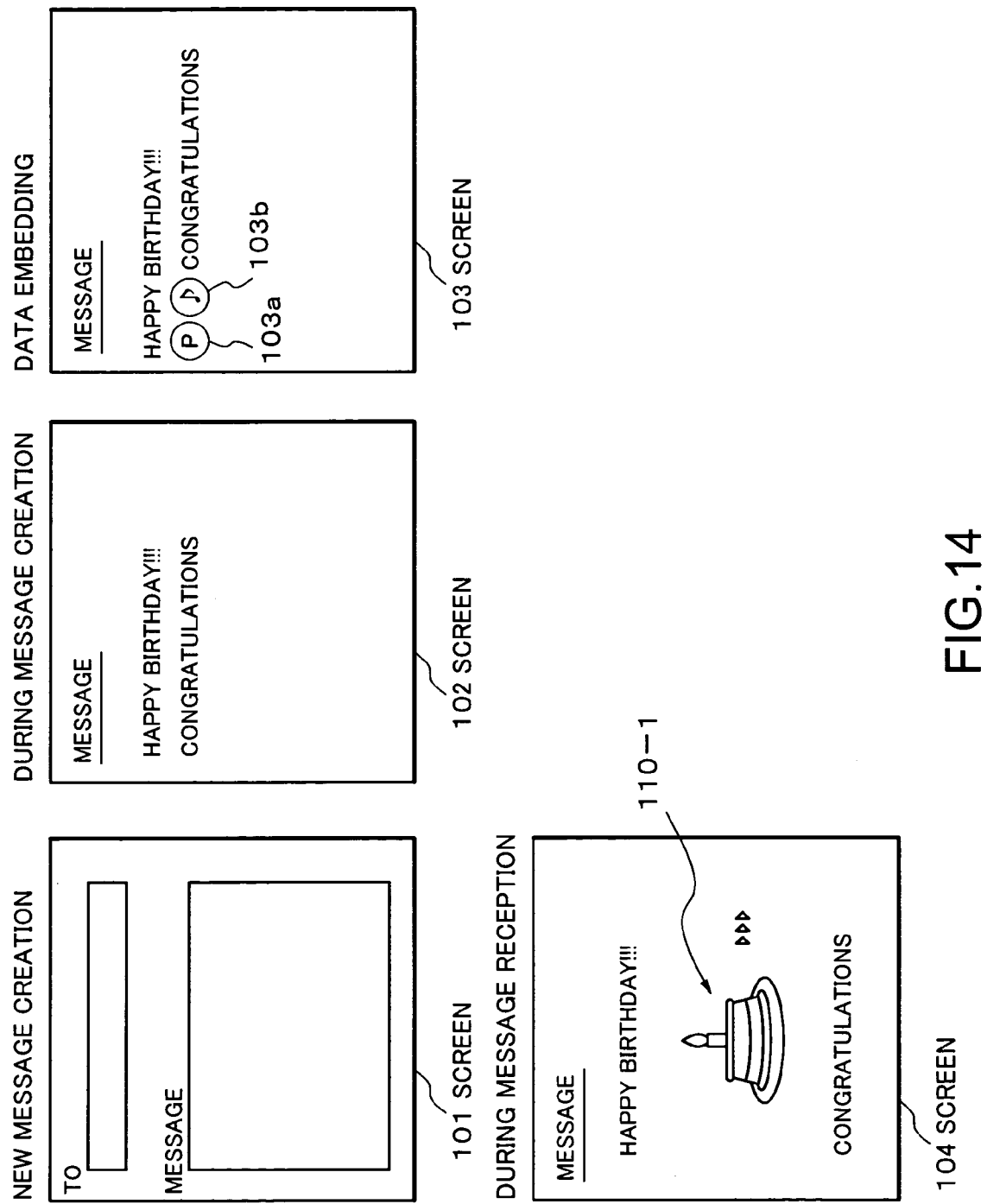
FIG. 14 shows a screen illustrative of a message creation example in the mobile terminal according to the first or second exemplary embodiment of the present invention shown in FIG. 1.

After the user has input a text message like that displayed on a screen 102 of new message creation of FIG. 14 (step S302), the control circuit 51 stores the created message in the memory circuit (not shown) (step S303), and transmits the message through the radio communication circuit 52 (step S304).

Referring to flowcharts of FIGS. 4 and 5, description will be made of operations of the message server 12 and the library server 13 of the first exemplary embodiment.

Figure 4:
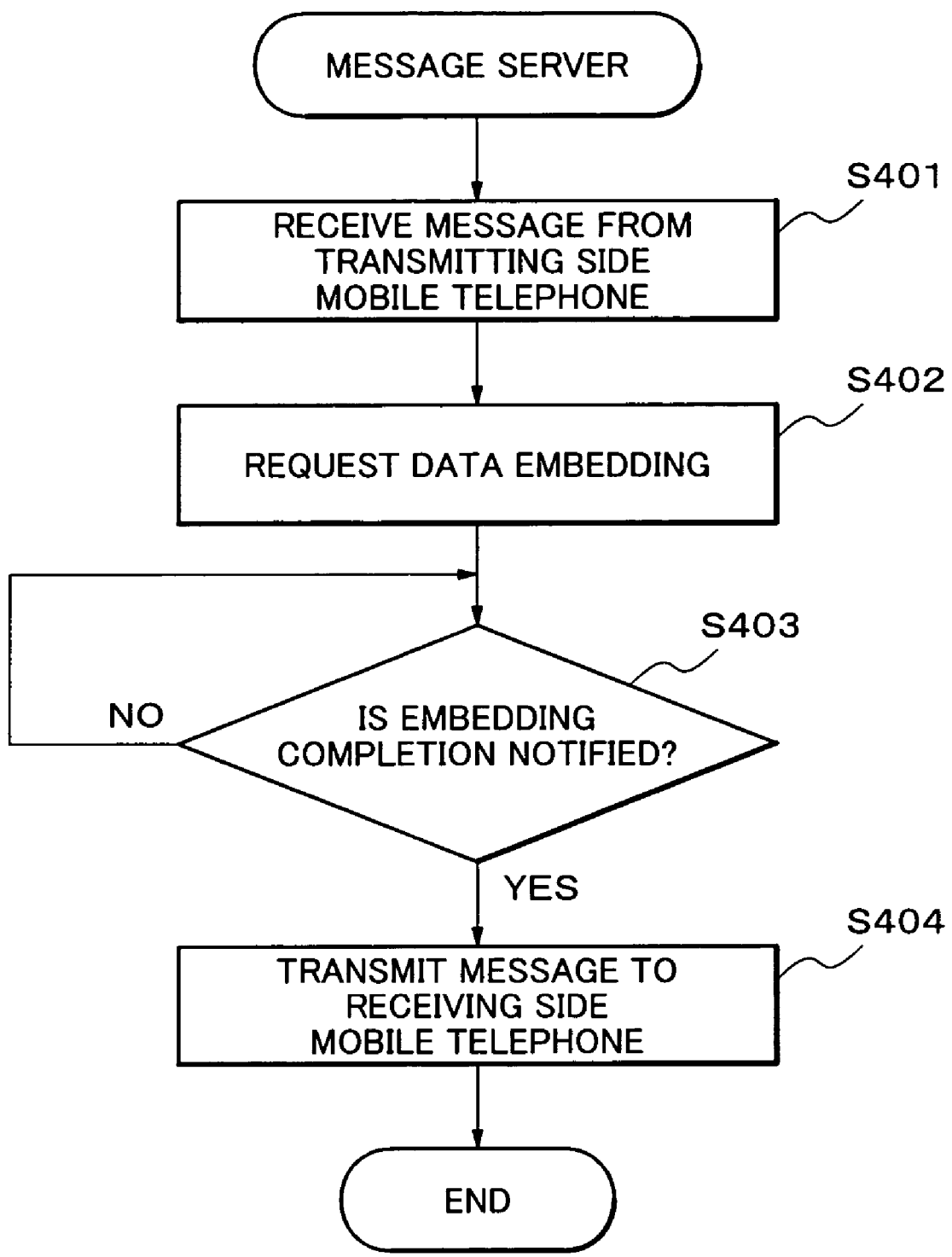
FIG. 4 is a flowchart illustrating an operation of a message server according to the first exemplary embodiment of the present invention shown in FIG. 1.

FIG. 4 shows a process in the message server 12. The message server 12 receives a message transmitted from the mobile terminal 11 (step S401 of FIG. 4). Then, the message server 12 requests the library server 13 to embed content data containing image data or sound data in the message (step S402). In this case, the message server 12 also transmits the message received from the mobile terminal 11 to the library server 13.

The library server 13 that has received the embedding request from the message server 12 extracts content data corresponding to a word in the message body from the data folder of the data storage unit 14, and embeds the content data in the message. Further, the library server 13 transmits the message having the content data embedded therein together with a confirmation notification to the message server 12.

Upon the reception of the confirmation notification of embedding completion from the library server 13 (step S403), the message server 12 transmits the message having the content data embedded therein to the mobile terminal 15 which is a message destination (step S404).

Accordingly, the mobile terminal 15 can receive the message which contains the image data or sound data in its body.

Figure 5:
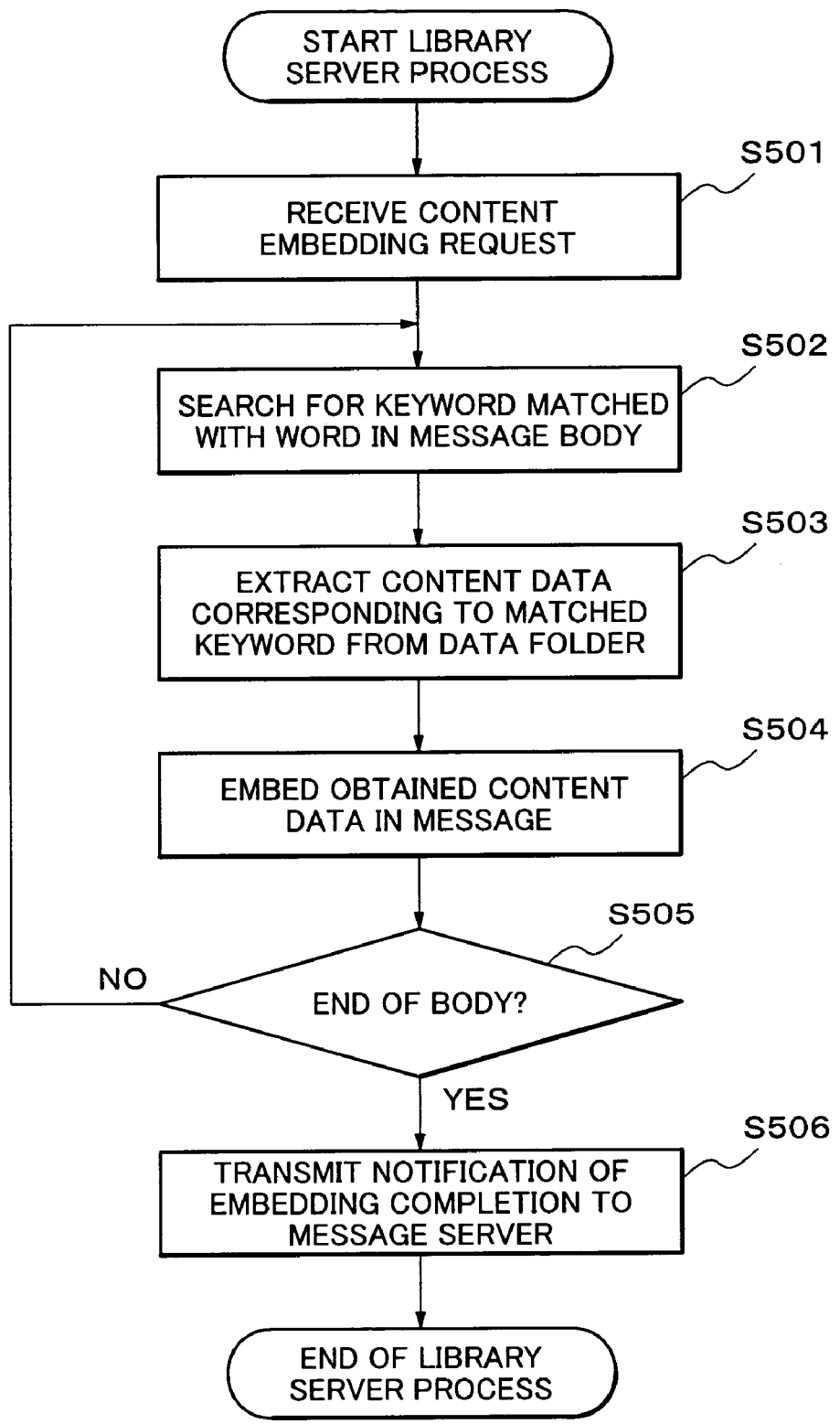
FIG. 5 is a flowchart illustrating an operation of a library server according to the first exemplary embodiment of the present invention shown in FIG. 1.

FIG. 5 is a flowchart showing an operation of the library server 13.

The library server 13 receives the embedding request for content data (image data, sound data, or the like) from the message server 12 (step S501 ). Then, the library server 13 searches for a keyword matched with a word of the message body among those stored in the data folder of the data storage unit 14 (step S502). In this case, the library server 13 extracts the word of the message body, and then searches for the keyword stored in the data folder of the data storage unit 14.

Upon the detection of the keyword matched with the word of the body, the library server 13 extracts all content data corresponding to the word of the message body from the data folder of the data storage unit 14. Additionally, the library server 13 extracts condition information of a sex, an age, occupation, and a hobby relevant to the user ID from the user registration information of the data storage unit 14.

Further, the library server 13 extracts most suitable content data from the data folder of the data storage unit 14 based on the extracted condition information. As a method of selecting the most suitable content data in this case, for example, the library server 13 carries out the following process. That is, the library server 13 extracts the sex, the age, the occupation, and the hobby from the user registration information of the data storage unit 14, and then counts the number of pieces of condition information registered in the column of use conditions (sex, age, occupation, and hobby) of all relevant content data in the data folder of the data storage unit 14.

Further, the library server 13 determines content data of the largest quantity to be most suitable (most similar to condition information), and extracts the content data determined to be most suitable from the data storage unit 14. If quantities are equal, then priority is set by the user in the server in advance among the pieces of condition information, and selection is made in the order of descending priorities (e.g., hobby, sex, age, and occupation in the order of descending). Upon the detection of the keyword matched with the word of the mail body from the data storage unit 14 in such a manner, the library server 13 extracts the content data (image data, sound data, or the like) corresponding to the keyword from the data storage unit 14 (step S503).

Then, the library server 13 embeds the extracted content data (image data, sound data, or the like) in the position of the word matched with the keyword in the message body (step S504).

The library server 13 repeats the process from the step S502 to the step S504, up to the end of the message body (step S505).

Upon the completion of the word extraction from the message body, a confirmation notification of the message embedding completion is transmitted together with the message having content data embedded therein to the message server 12 (step S506).

Figure 6:
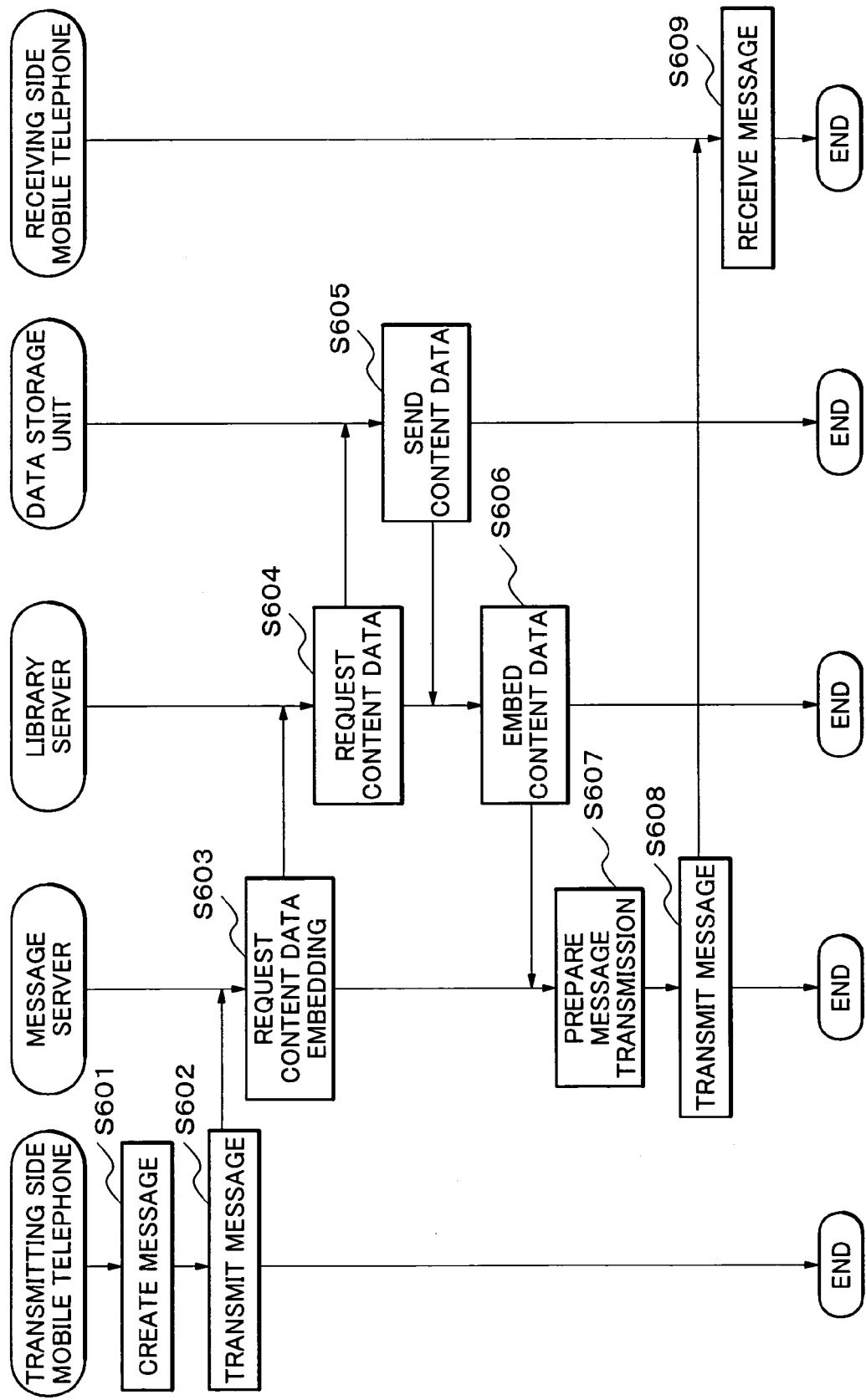
FIG. 6 is a sequence diagram illustrating an operation of the entire system according to the first exemplary embodiment of the present invention.

Referring to a sequence diagram of FIG. 6 and the message creation example of FIG. 14, the overall operation of the system of the first exemplary embodiment will be described in detail. Here, description will be made of an operation when a message is transmitted from the mobile terminal 11 on the transmitting side to the mobile terminal 15 on the receiving side.

At the mobile terminal 11, to send a message to the mobile terminal 15, the user starts the mailer 56, and selects new message creation from the menu screen. Then, the control circuit 51 of the mobile terminal 11 causes the user to create a message from the screen of the display unit 59 (step S601 of FIG. 6). The screen 101 of FIG. 14 indicates a state in which a new message creation screen is displayed by the display unit 59 of the mobile terminal 11 after the start of the mailer 56 in this case.

The user inputs a destination address (e.g., mail address) to the screen 101 of FIG. 14 by using the operation unit 55, and inputs a message text like that displayed on a new message creation screen 102 of FIG. 14 by using the operation unit 55. After the completion of the message inputting operation, the control circuit 51 of the mobile terminal 11 creates a message header which contains a transmission source address, a transmission destination address, a transmission date, and the like, creates a message in which the created header is added to its body, and transmits the message to the opposite mobile terminal 15 through the radio communication circuit 52 (step S602).

The message server 12 receives the transmitted message to relay it. Then, the message server 12 requests the library server 13 to embed content data (image data, sound data, or the like) in the message body (step S603).

The library server 13 that has been requested to execute the embedding operation searches the data folder of the data storage unit 14 for a keyword matched with a word of the message. If the matched keyword is present, then the library server 13 requests the data storage unit 14 to obtain content data corresponding to the keyword (step S604).

The data storage unit 14 sends the requested content data (image data or sound data) to the library server 13 (step S605) The library server 13 that has obtained the content data (image data or sound data) embeds the content data in a position of the word matched with the keyword in the message body. The processes of searching a keyword and embedding content data are repeated to the end of the message body.

Upon completion of the content data embedding process to the end of the message body, the library server 13 sends a confirmation notification of embedding completion together with the message having content data embedded therein to the message server 12 (step S606). Displayed on a screen 103 of FIG. 14 is an example of a message having content data embedded therein in this case. Here, in the case of the screen 103, image data 103a and sound data 103b are embedded.

Upon reception of the message in which the content data have been embedded, the message server 12 makes preparation to send the message which contains the image data and the sound data to the mobile terminal 15 (step S607), and transmits the message to the mobile terminal 15 (step S608).

The message transmitted from the mobile terminal 11 is only a text. However, when the mobile terminal 15 opens the received message (step S609), an image 110-1 matched with a sentence and a word is displayed in the position of the sentence and the word of the message body like that displayed on a screen 104 of FIG. 14 at the time of message reception, and a related sound is simultaneously output.

The system of the first exemplary embodiment thus configured and operated can achieve the following effects.

According to the first exemplary embodiment, in the message transmission/reception between the mobile terminals, only by executing a normal message transmission process without embedding content data (image data, sound data, or the like) during message creation, content data (image data, sound data, or the like) concerning a message to be transmitted can be automatically embedded according to the user's preference, and the message can be distributed to the receiving side. Thus, it is possible to greatly save the user's labor for creating the message.

In particular, according to the first exemplary embodiment, when data other than the content data prestored in the mobile terminal is used, it is not necessary to carry out work, such as manually downloading and obtaining content data from the content provider's web site for the mobile terminal by each user.

Furthermore, since it is not necessary to store content data to be embedded in a message in the mobile terminal, a memory load in the mobile terminal can be reduced.

Next, a system according to a second exemplary embodiment of the present invention will be described in detail with reference to the accompanying drawings.

The entire configuration of the system of the second exemplary embodiment is similar to that of FIG. 1, and thus description thereof will be omitted.

According to the second exemplary embodiment, a message in which content data (image data or sound data) is embedded by a library server 13 is checked by a mobile terminal on a transmitting side, and the mobile terminal is operated to request content data to be changed or added from the library server 13. Further, according to the second exemplary embodiment, each of the mobile terminals 11, 15 obtains the embedded data through the liberty server 13, whereby a message can be edited to change, add, or delete the content data in the mobile terminal.

In addition to the functions described above with reference to the first exemplary embodiment, the library server 13 manages the content data used in the message from the user as user information unique to each user of the mobile terminal 11 or 15 in the data storage unit 14. The library server 13 further has a function of transmitting content data suited to the user's taste and preference based on the user information of the user in response to requests for content data from the mobile terminals 11, 15.

As in the first exemplary embodiment, content data are stored in a data folder of the data storage unit 14 in association with a keyword which indicates a word targeted for the content data embedding operation. Accordingly, there are one or a plurality of content data corresponding to one keyword. Additionally, in the data folder of the data storage unit 14, as suitable yardsticks for a user to use contents, use conditions for users (sex, age, occupation, hobby, and the like) are preregistered for each content data so that the library server 13 can make determination. Note that, a structural example of the data folder of the data storage unit 14 is shown in FIG. 12 as in the first exemplary embodiment.

An area of user information which is not set in the first exemplary embodiment is allocated to the data storage unit 14. In the area of the user information, content data embedded in the message from the user or content data selected by the user in editing at the mobile terminal side are stored as information unique to each user of the mobile terminal 11 or 15. Further, in the user information, a keyword thereof is associated with each content data. Thus, there are one or a plurality of content data corresponding to one keyword.

Figure 13:
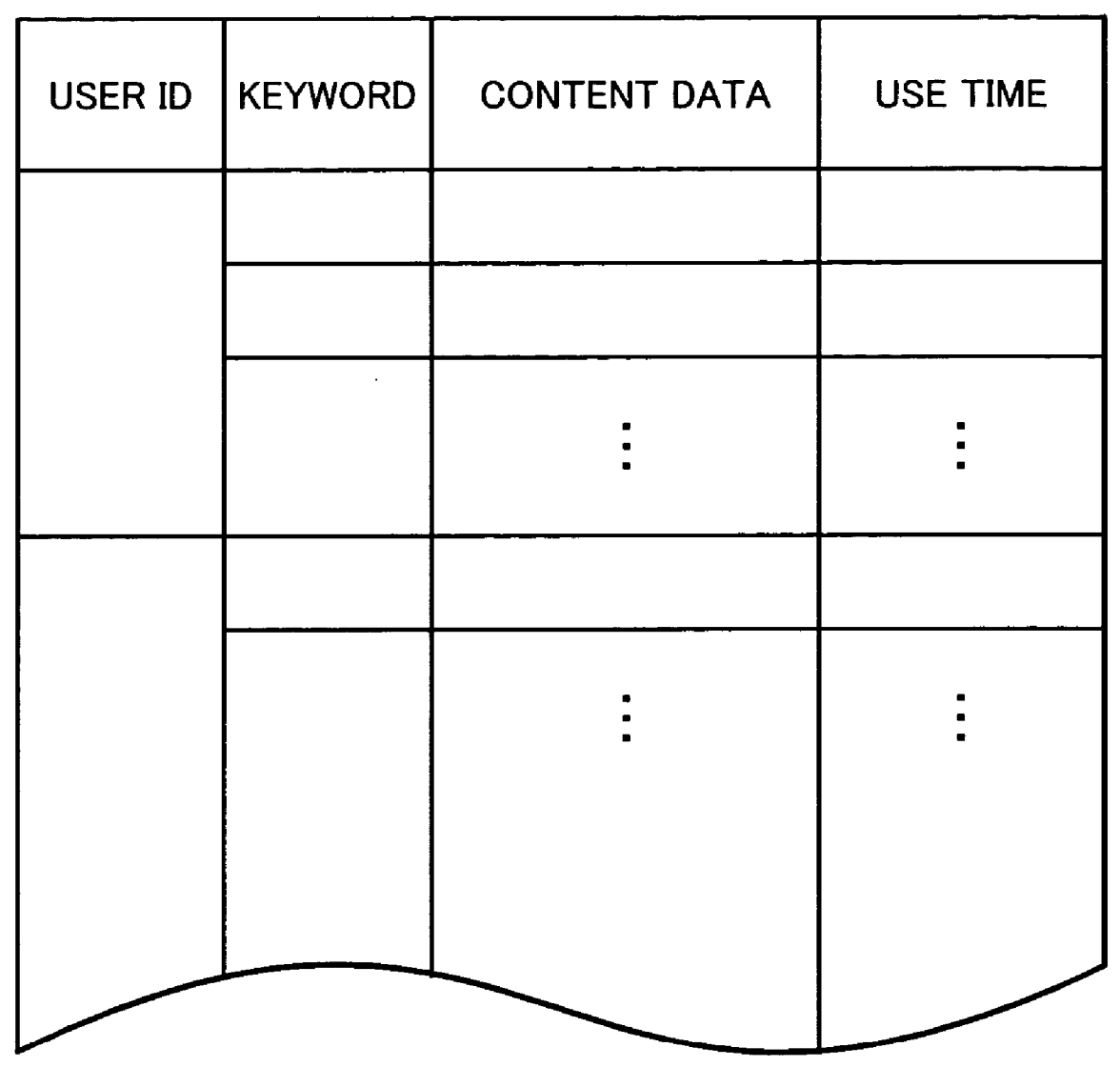

FIG. 13 shows an example of user information in the data storage unit 14. The user information of FIG. 13 contains a user ID, a keyword, content data, and a use time for each user ID. The user ID is user identification information to identify a user, preferably a transmission source mail address added to a message header. However, the user ID may be user identification information issued when the user makes registration at a service provider (e.g., mobile telephone company) to receive services, or identification information of a mobile terminal. The keyword corresponds to a word in a message body. The content data is image data, sound data, or the like corresponding to the word in the message body. The use time is a time when the content data is embedded in the message, or a time when contents are selected from a list sent to the mobile terminal. A unit of the use time may be a year, a month, a day, an hour, a minute, and a second. However, the unit is not limited to this. The use time is used to determine a type of latest used content data.

The user information of the data storage unit 14 is updated by the library server 13 each time content data is embedded or content data is selected by the user of the mobile terminal.

There is user registration information stored in the data storage unit 14. The user registration information in this case is information registered at the time of user registration or updating. For each user ID, a user name, an address, a sex, occupation, an age, and the like are registered in the user registration information in the data storage unit 14.

Figure 7:
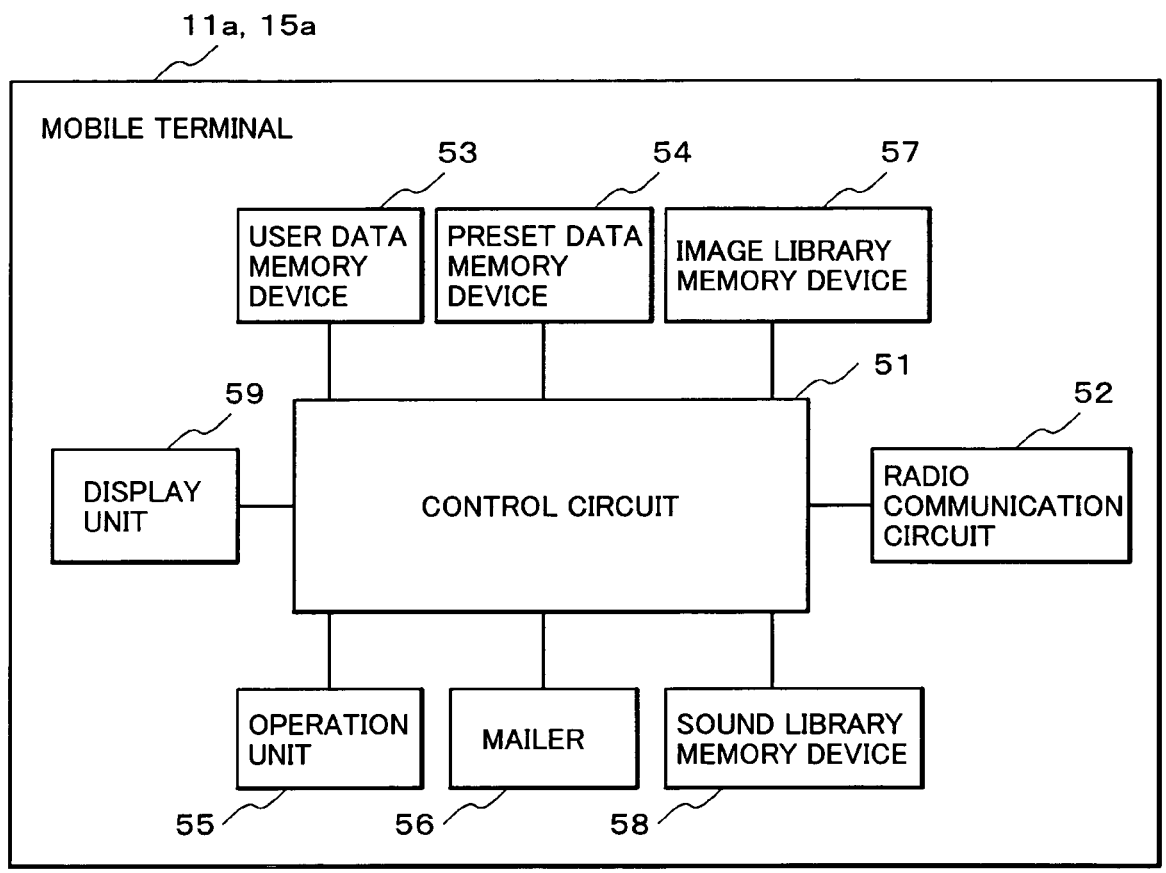
FIG. 7 is a block diagram showing a configuration of a mobile terminal according to the second exemplary embodiment of the present invention shown in FIG. 1.

Referring to FIG. 7, description will be made of a configuration common to the mobile terminals 11a, 15a of the second exemplary embodiment.

Each of the mobile terminals 11a, 15a is configured by adding an image library memory device 77 for storing image data which the user obtains by downloading or the like, and a sound library memory device 78 for storing sound data which the user obtains by downloading or the like to the mobile terminal of the first exemplary embodiment shown in FIG. 2. Other components are similar to those of the first exemplary embodiment.

The image library memory device 77 and the sound library memory device 78 of each of the mobile terminals 11a, 15a are realized by electronic memory circuits (flash memories or the like) incorporated therein.

Functions of each of the mobile terminals 11a, 15a of the second exemplary embodiment are achieved by a CPU executing various programs. In addition to the functions of the mobile terminal of the first exemplary embodiment, each of the mobile terminals 11a, 15a of the second exemplary embodiment has functions of receiving a message having content data embedded therein from the library server 13, and directly accessing the library server 13 to execute editing such as changing, adding, or deleting of the content data in the message.

Figure 8:
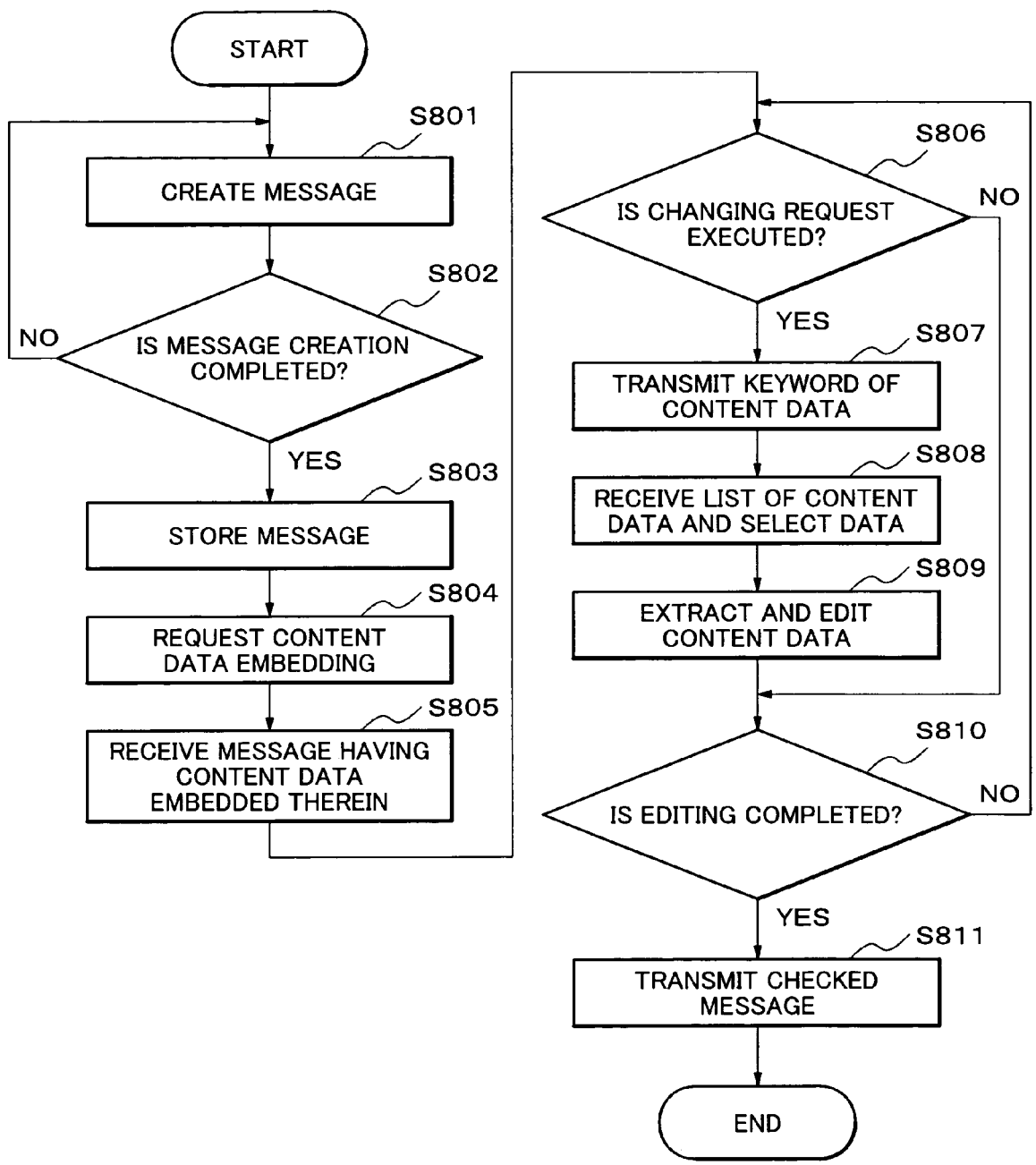
FIG. 8 is a flowchart illustrating an operation of the mobile terminal during message transmission according to the second exemplary embodiment of the present invention shown in FIG. 1.
Figure 9:
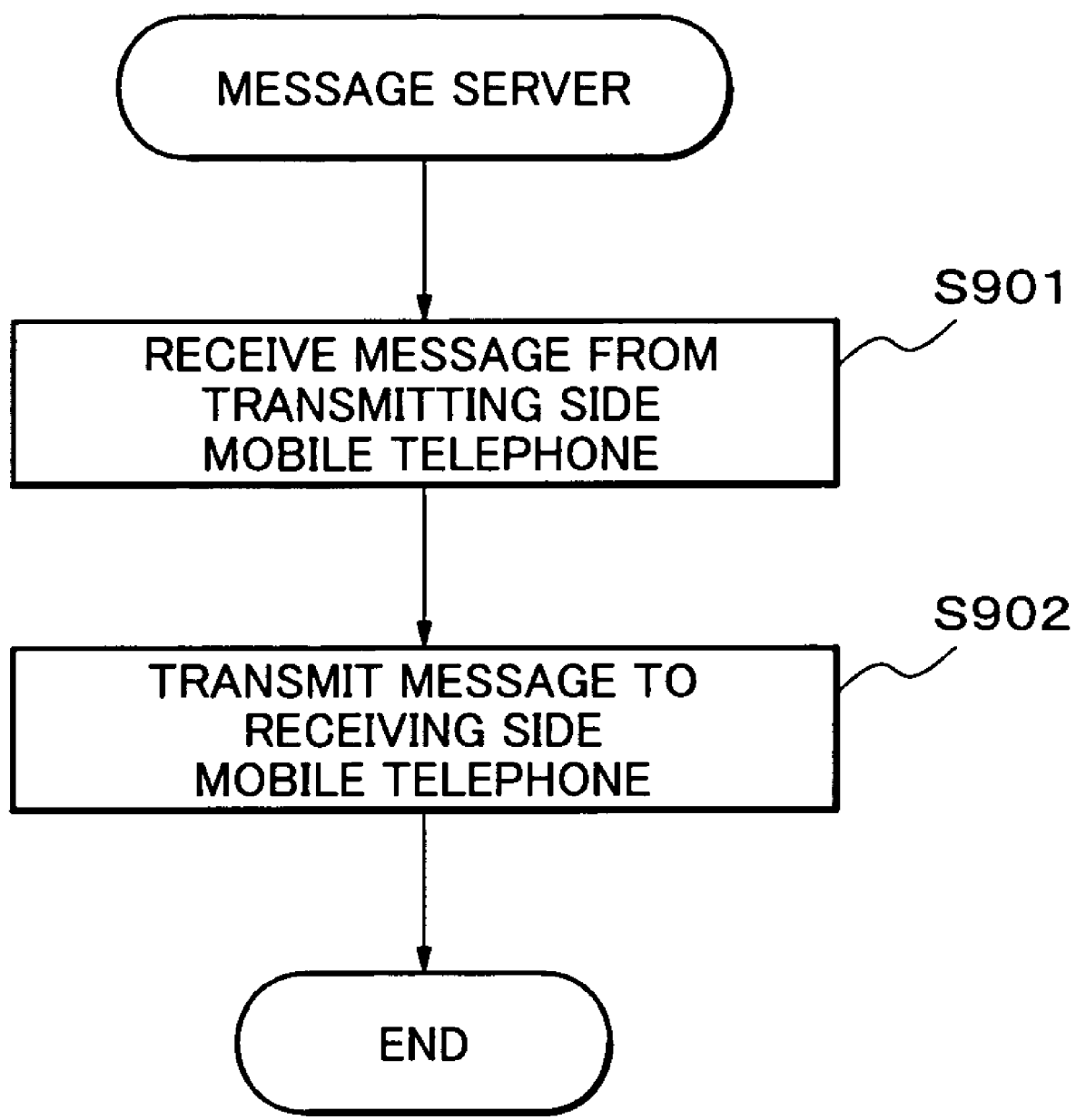
FIG. 9 is a flowchart illustrating an operation of a message server according to the second exemplary embodiment of the present invention shown in FIG. 1.
Figure 10:
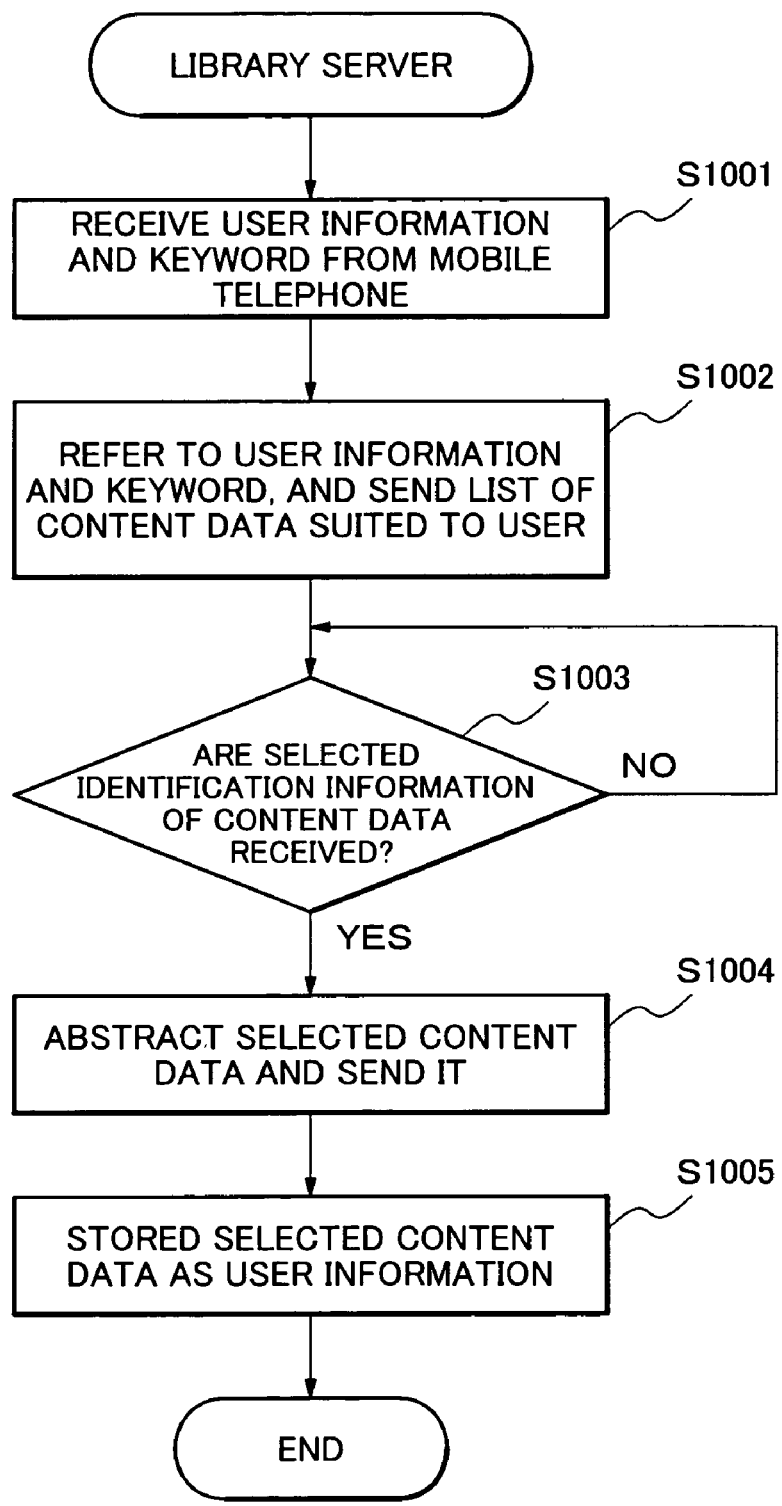
FIG. 10 is a flowchart illustrating an operation of a library server according to the second exemplary embodiment of the present invention shown in FIG. 1.
Figure 11:
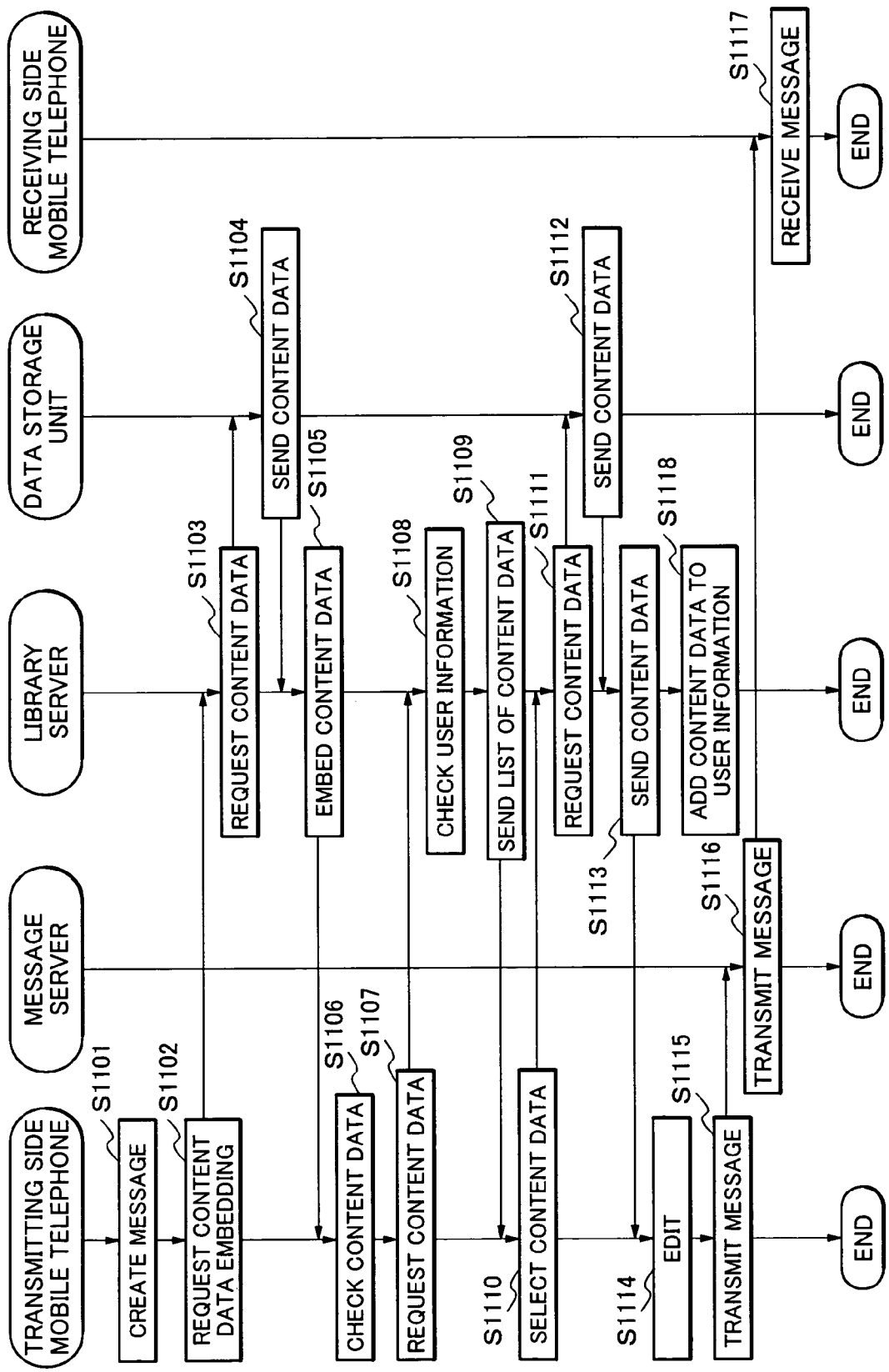
FIG. 11 is a sequence diagram illustrating an operation of the entire system according to the second exemplary embodiment of the present invention.

Next, referring to FIGS. 8 to 12, description will be made of an operation of the message distribution system of the second exemplary embodiment. FIG. 8 is a flowchart showing an operation of the mobile terminal. FIG. 9 is a flowchart showing an operation of the message server 12. FIG. 10 is a flowchart showing an operation of the library server 13. FIG. 11 is a sequence diagram showing an entire operation of the system. Here, description will be made of an operation when the mobile terminal 11a on a transmitting side transmits a message to the mobile terminal 15a on a receiving side.

To send a message to the opposite mobile terminal 15a, the user starts the mailer 56 and selects new mail creation on a menu screen. Then, the mobile terminal 11a causes the user to create a message from a screen of the display unit 59 (step S801 of FIG. 8, and step S1101 in a sequence chart of FIG. 11). The screen 101 of FIG. 14 indicates a state in which a new message creation screen is displayed by the display unit 59 after the mailer 56 is started in this case.

After completion of the message creation (step S802), the mobile terminal 11a stores the created message in a memory circuit (not shown) (step S803), and transmits the message through the radio communication circuit 52 to the library server 13. In this case, the mobile terminal 11a requests the library server 13 to embed content data (image data, sound data, or the like) in the created message (step S804, and step S1102 in a sequence chart of FIG. 11).

The library server 13 that has received the message and the content data embedding request from the mobile terminal 11a executes a content data embedding operation similar to that of FIG. 5.

However, the second exemplary embodiment is different from the first exemplary embodiment in that in the steps S502 and S503 of FIG. 5, the library server 13 not only searches for a keyword but also refers to user information to execute content data embedding. The second exemplary embodiment is additionally different from the first exemplary embodiment in that after the step S506 of FIG. 5

(transmission of the message having content data embedded therein to the opposite mobile terminal), the library server 13 adds (or updates) the content data embedded in the message to the user information of the data storage unit 14.

That is, before searching for a keyword stored in the data folder of the data storage unit 14, the library server 13 searches for a keyword matched with a word in a message body among those contained in the user information of the user. In this case, the library server 13 extracts all contents corresponding to the keyword matched with the word in the message body from the user information corresponding to a received user ID, and then extracts contents of a latest use time from the extracted contents.

If there is no relevant keyword in the user information of the data storage unit 14, then the library server 13 searches the data folder of the data storage unit 14. In this case, the library server 13 extracts all content data corresponding to the keyword matched with the word of the message body from the data folder of the data storage unit 14. Additionally, the library server 13 extracts condition information of a sex, an age, occupation, and a hobby relevant to the user ID from the user registration information of the data storage unit 14. Further, the library server 13 extracts most suitable content data from the data folder of the data storage unit 14 based on the extracted condition information. A method of extracting the most suitable content data (most similar to condition information) in this case is similar to that of the step S503 of the first exemplary embodiment, and thus description thereof will be omitted. Upon detection of the keyword matched with the word in the mail body from the data storage unit 14 in such a manner, the library server 13 extracts content data (image data, sound data, or the like) corresponding to the keyword from the data storage unit 14 (steps S1103 and S1104 in a sequence chart of FIG. 11).

Subsequently, the library server 13 embeds the extracted content data (image data, sound data, or the like) in a position of the word matched with the keyword in the message body (S1105 of FIG. 11). The library server 13 sequentially extracts words from a head of the message body, and repeats the embedding process based on the extracted words to the end of the message body.

Upon completion of the operation of embedding the content data, the library server 13 transmits the message having content data embedded therein to the transmitting side mobile terminal 11a of a message creation source, and requests the mobile terminal to check contents of the message (step S1105 in a sequence chart of FIG. 11).

Upon reception of the message indicating the completion of the embedding process for the message having content data embedded therein through the radio communication unit 52 (step S805 of FIG. 8), the control circuit 51 on the transmitting side mobile terminal 11a displays the received message on the display unit 59, and causes the user to check the embedded content data (S1106 of FIG. 11). In this case, the control circuit 51 displays a comment to suggest the user to check the data on the display unit 59, and a button (e.g., OK button) to input the result thereof on the same.

With the user's operation, the control circuit 51 can store the image data or the sound data embedded in the message in an image library memory device 57 or a sound library memory device 58.

If there is no change or addition to the content data (image data or sound data) embedded in the message in the step S1106 in the sequence chart, then the user selects the OK button on the screen by using an operation unit 55. Then, the control circuit 51 of the mobile terminal 11a transmits the checked message to the mobile terminal 15a through the message server 12 (step S811 of FIG. 8, and steps S901 and S902 of FIG. 9).

If the user wishes to change the content data to be embedded because the image data or the sound data as the content data does not match the contents of the message body in meaning or the like, then the user makes a changing request by using the operation unit 55. Then, the control circuit 51 of the mobile terminal 11a requests the library server 13 to change the content data (step S806, and step S1107 of FIG. 11). In this case, the user of the mobile terminal 11a clicks the embedded image data or sound data in a position to be changed in the message, and designates "CHANGE" of the content data, whereby the library server 13 is requested to change the content data.

After the mobile terminal 11a accesses the library server 13 to be connected based on the changing request, the control circuit 51 of the mobile terminal 11a transmits a user ID and a keyword corresponding to the embedded image data or sound data which has been clicked to the library server 13 (step S807)

The library server 13 that has received the user ID and the keyword from the mobile terminal 11a (step S1001 of FIG. 10) checks whether there is user information corresponding to the user ID or not in the data storage unit 14 (step S1108 in a sequence chart). The library server 13 extracts content data (image data or sound data) relevant to the received keyword from the data storage unit 14, lists the extracted content data, and transmits the list to the mobile terminal 11a (step S1002, and step S1109 in a sequence chart).

If it is determined in the step S1108 in the sequence chart that there is user information in the data storage unit 14, then the library server 13 extracts all content data corresponding to the received keyword in the user information. Additionally, the library server 13 extracts content data not selected by the user in the past from the data folder of the data storage unit 14. The library server 13 lists the identification information of the extracted content data, and sends the list to the user mobile terminal 11a of the request source. Accordingly, since the list contains the identification information of the content data extracted from the user information, the user can select content data such as image data or sound data highly suitable to user's taste (e.g., sex, age, occupation, or the like). If there is no user information in the data storage unit 14, then the library server 13 lists the identification information of content data extracted from the data folder, and sends the list to the user mobile terminal 11a of the request source.

In the case of extracting the identification information of content data from the data folder, the library server 13 may extract limited content data suited to user's preference (e.g., sex, age, occupation, or the like) from several content data. Accordingly, as in the case of the user information, the user can select content data such as image data or sound data highly suitable to user's taste (e.g., sex, age, occupation, or the like).

The control circuit 51 of the mobile terminal 11a that has received the list through the radio communication unit 52 displays the received list on the display unit 59. The user of the mobile terminal 11a selects desired content data from the sent list (step S808, and step S1110 in a sequence chart) Then, the control circuit 51 of the mobile terminal 11a transmits information selected from the list to the library server 13.

Upon reception of the selected information of the content data (step S1003), the library server 13 extracts the selected content data corresponding to the selected information of the content data from the data storage unit 14 (S1111 and S1112 of FIG. 11), and sends the extracted content data to the mobile terminal 11*a* (step S1004, and step S1113 of FIG. 11). In this case, the extracted content data is the selected content data selected by user.

Further, the library server 13 causes the control circuit 51 of the mobile terminal 51 to store the selected content data in an area of the user information of the data storage unit 14 corresponding to the requested user ID (step S1118). In this case, since the library server 13 sets a current time in the column of the use time in the user information, the selected content data and a keyword corresponding thereto are added as content data with the highest priority among identical keywords. Note that, if content data that has been selected is present in the user information, the library server 13 sets a current time in the column of the use time to give the highest priority thereto.

The mobile terminal 11*a* obtains the sent content data, and replaces the originally embedded content data by the obtained content data to execute editing such as changing (step S809).

The user of the mobile terminal 11*a* can delete other unnecessary image data or sound data. If it is necessary to add image data or sound data, then the aforementioned changing request is made to the library server 13 to carry out editing work to the end of the message body (step S810, and step S1114 of FIG. 11).

If the editing of the embedded contents is completed or no change is made, then the checked message is transmitted to the destination mobile terminal 15*a* through the message server 12 (step S811, and steps 1115 and S1116 in a sequence chart)

The control circuit 51 of the mobile terminal 15*a* that has received the checked message can receive a message having image data and sound data added to its body, for example, as shown in screen 104 of FIG. 14 (S1117 of FIG. 11).

In the step S804 and the step S1102 in the sequence chart, the embedding request is transmitted to the library server 13. However, the embedding request maybe transmitted to the message server 12. Then, the message sever 12 will take over transfer of commands or data between the transmitting side mobile terminal 11*a* and the library server 13 thereafter (steps S1105 to S1113 in a sequence chart).

As described above, according to the second exemplary embodiment, the library server 13 adds the content data selected by the user to the user information in the data storage unit 14 each time the user accesses the library server 13. When the library server 13 embeds the content data, the content data embedded in the message is added to the user information. Thus, next time the user transmits a message, according to the second exemplary embodiment, it is possible to embed content data similar to latest user information of the user. As a result, according to the second exemplary embodiment, it is possible to reduce the number of times of changing the content data when the user checks the message sent from the library server 13.

The system of the mobile terminal example of the second embodiment is configured and operated in the aforementioned manner to provide the following effects in addition to those of the first exemplary embodiment.

The mobile terminal 11*a* accesses the library server 13 to enable reediting (changing, adding, or deleting) of the content data (image data, sound data, or the like) embedded in the message after its creation. Thus, it is possible to embed content data of contents according to the user's intention.

Moreover, the content data selected by the user in content data editing is managed as user information, and the content data is embedded by referring to the user information. Thus, it is possible to crease a message in which content data suitable to user's preference and taste is embedded.

The present invention has been described based on the exemplary first and second embodiments. However, the exemplary embodiments are in no way intended to limit the present invention. Various changes can be made without departing from the scope of technical idea of the present invention.

For example, each of the first and second exemplary embodiments includes the library server 13 for embedding the content data separately from the message server 12. However, the message sever 12 may have the contents embedding function of the library server 13.

Furthermore, the library server 13 can transmit a company's commercial information, service coupons, and the like together with video data to the mobile telephone on the receiving side.

Further, it is the inventor's intent to retain all equivalents of the claimed invention even if the claims are amended during prosecution.

What is claimed is:

1. A message distribution system which distributes messages for transmission/reception between mobile terminals, comprising:

a message distribution server which receives a message transmitted from one of the mobile terminals and distributes the message to the mobile terminal on a receiving side; and a library server which includes:

a data storage unit storing a plurality of content data corresponding to a keyword; and a control circuit which:

executes a search to determine matching with the keyword stored in the data storage unit by using a word contained in a body of the message as a key upon a request from one of the message distribution server and the mobile terminal;

extracts, when the word matches the keyword, all content data corresponding to the keyword from the data storage unit, and extracts content data based on predetermined transmission user condition information from the extracted content data;

embeds the extracted content data based on the predetermined transmission user condition information in the message; and adds the extracted content data embedded in the message to said transmission user condition information.

2. The message distribution system according to claim 1, wherein:

the control circuit makes a content checking request by transmitting the message having content data embedded therein to the mobile terminal upon a request from the mobile terminal; and the mobile terminal performs at least one of changing, deleting, and adding of the content data embedded in the message based on the checking request.

3. The message distribution system according to claim 2, wherein the control circuit:

stores the content data embedded in the message transmitted from the mobile terminal and a keyword corresponding to the embedded content data as user information unique to each user of the mobile terminal, in the data storage unit;

extracts, when the checking request is accompanied by a request for one of changing and adding of the content data corresponding to a requested keyword from the mobile terminal, pieces of identification information of content data suited to the user based on the requested keyword and the user information to collect the pieces of identification information in a list; and transmits the list to the mobile terminal.

4. The message distribution system according to claim 3, wherein:

the mobile terminal further requests, after the user selects identification information of the content data from the received list, the content data corresponding to the selected identification information to the library server; and the control circuit further transmits content data corresponding to the selected identification information to the mobile terminal of a request source upon reception of the request for the content corresponding to the selected identification information from the mobile terminal; and stores, upon the reception of the request for the content data corresponding to the selected identification information from the mobile terminal, the content data corresponding to the selected identification information as the user information containing content data latest in history, in the data storage unit.

5. The message distribution system according to claim 1, wherein:

the data storage unit includes user information in which one or a plurality of content data corresponding to each keyword is stored for each user identification; and the control circuit extracts the content data corresponding to the keyword from the user information when the word matches the keyword, and further extracts the content data similar to the predetermined condition information from the extracted content data.

6. The message distribution system according to claim 1, wherein:

the data storage unit includes a data folder which is used by all registered users and which stores at least one of content data corresponding to each keyword; and the control circuit extracts the content data corresponding to the keyword from the data folder when the word matches the keyword, and further extracts content data most similar to condition information containing one or more of a sex, an age, an occupation, and a hobby from the extracted content data.

7. The message distribution system according to claim 1, wherein the content data includes at least one of image data and sound data.

8. A server which distributes messages for transmission/reception between mobile terminals, comprising:

a data storage unit storing a plurality of content data corresponding to a keyword;

a control circuit which:

executes a search to determine matching with the keyword stored in the data storage unit by using a word contained in a body of the message as a key;

extracts, when the word matches the keyword, content data corresponding to the keyword from the data storage unit, and extracts content data based on predetermined transmission user condition information from the extracted content data;

embeds the extracted content data based on the predetermined transmission user condition information in the message; and adds the content data embedded in the message to said transmission user condition information.

9. The server according to claim 8, wherein:

the control circuit makes a content checking request by transmitting the message having content data embedded therein to the mobile terminal upon a request from the mobile terminal.

10. The server according to claim 9, wherein the control circuit:

stores the content data embedded in the message transmitted from the mobile terminal and a keyword corresponding to the embedded content data as user information unique to each user of the mobile terminal in the data storage unit; and extracts, when the checking request is accompanied by a request for one of changing and adding of the content data corresponding to a requested keyword from the mobile terminal, pieces of identification information of content data suited to the user based on the requested keyword and the user information to collect the pieces of identification information in a list, and transmits the list to the mobile terminal.

11. The server according to claim 10, wherein the control circuit:

transmits, when the request for the content data corresponding to identification information of the content data selected from the list is received from the mobile terminal, the content data corresponding to the selected identification information to the mobile terminal of a request source; and stores, upon the reception of the request for the content data corresponding to the selected identification information from the mobile terminal, the content data corresponding to the selected identification information as the user information containing content data latest in history, in the data storage unit.

12. The server according to claim 8, wherein:

the data storage unit includes user information in which one or a plurality of content data corresponding to each keyword is stored for each user identification; and the control circuit extracts all the content data corresponding to the keyword from the user information when the word matches the keyword, and further extracts the content data similar to the predetermined condition information from the extracted content data.

13. The server according to claim 8, wherein:

the data storage unit comprises a data folder which is used by all registered users and which stores at least one of content data corresponding to each keyword; and extracts the content data corresponding to the keyword from the data folder when the word matches the keyword, and further extracts content data most similar to condition information containing one or more of a sex, an age, an occupation, and a hobby from the extracted content data.

14. The server according to claim 8, wherein tho content data includes at least one of image data and sound data.

15. A message distribution method of causing a server to distribute messages for transmission/reception between mobile terminals, comprising:

executing a search to determine matching with a keyword stored in a data storage unit by using a word contained in a body of the message as a key in one of when the message is relayed from the mobile terminal and when a request to embed content data is received from the mobile terminal;

extracting, when the word matches the keyword, content data corresponding to the keyword from the data storage unit, and extracting content data based on predetermined transmission user condition information from the extracted content data;

embedding, the extracted content data based on the predetermined transmission user condition information in the message; and adding the extracted content data embedded in the message to said transmission user condition information.

16. The message distribution method according to claim 15, further comprising:

making, in the server, a content checking request by transmitting the message having content data embedded therein to the mobile terminal upon a request from the mobile terminal; and performing in the mobile terminal, at least one of changing, deleting and adding of the content data embedded in the message based on the checking request.

17. The message distribution method according to claim 16, further comprising:

storing, in the server, the content data embedded in the message transmitted from the mobile terminal and a keyword corresponding to the embedded content data as user information unique to each user of the mobile terminal, in the data storage unit; and extracting, in the server, when the checking request is accompanied by a request for one of changing and adding of the content data corresponding to a requested keyword from the mobile terminal, pieces of identification information of content data suited to the user, based on the requested keyword and the user information, to collect the pieces of identification information in a list, and transmitting the list to the mobile terminal.

18. The message distribution method according to claim 17, further comprising:

requesting, in the mobile terminal, after the user selects identification information of the content data from the received list, the content data corresponding to the selected identification information to the server;

transmitting, in the server, the content data corresponding to the selected identification information to the mobile terminal of a request source upon reception of the request for the content data corresponding to the selected identification information from the mobile terminal; and storing, in the server, upon the reception of the request for the content data corresponding to the selected identification information from the mobile terminal, the content data corresponding to the selected identification information as the user information containing content data latest in history, in the data storage unit.

19. The message distribution method according to claim 15, wherein:

the data storage unit includes user information in which at least one of content data corresponding to each keyword is stored for each user identification; and the extracting includes extracting all the content data corresponding to the keyword from the user information when the word matches the keyword, and further extracting the content data similar to the predetermined condition information from the extracted content data.

20. The message distribution method according to claim 15, wherein:

the data storage unit includes a data folder which is used by all registered users and which stores at least one of content data corresponding to each keyword; and the extracting includes extracting all the content data corresponding to the keyword from the data folder when the word matches the keyword, and further extracting content data most similar to condition information containing one or more of a sex, an age, an occupation, and a hobby from the extracted content data.

21. The message distribution method according to claim 15, wherein the content data includes at least one of image data and sound data.

22. A signal-bearing medium for storing a message distribution program for causing a computer which distributes messages for transmission/reception between mobile terminals to execute the processings of:

executing a search for a keyword matching a word contained in a body of the message through a data storage unit storing a plurality of content data corresponding to the keyword;

extracting, when the word matches the keyword, content data corresponding to the keyword from the data storage unit, and extracting content data based on predetermined transmission user condition information from the extracted content data;

embedding the extracted content data based on the predetermined transmission user condition information in the message; and adding the extracted content data embedded in the message to said transmission user condition information.

23. The medium according to claim 22, further causing the computer to execute a processing of making a content checking request by transmitting the message having content data embedded therein to the mobile terminal upon a request from the mobile terminal.

24. The medium according to claim 23, further causing the computer to execute the processings of:

storing the content data embedded in the message transmitted from the mobile terminal and a keyword corresponding to the embedded content data as user information unique to each user of the mobile terminal, in the data storage unit; and extracting, when the checking request is accompanied by a request for one of changing and adding of the content data corresponding to a requested keyword from the mobile terminal, pieces of identification information of content data suited to the user based on the requested keyword and the user information to collect the pieces of identification information in a list, and transmitting the list to the mobile terminal.

25. The medium according to claim 24, further causing the computer to execute the processings of:

transmitting content data corresponding to the selected identification information of the content data to the mobile terminal of a request source when the request for content data corresponding to the identification information selected from the list is received from the mobile terminal; and storing, upon the reception of the request for content data corresponding to the selected identification information from the mobile terminal, the content data corresponding to the selected identification information as the user information containing content data latest in history, in the data storage unit.

26. The medium according to claim 22, wherein:

the data storage unit contains user information in which at least one of content data corresponding to each keyword is stored for each user identification; and the processing of extracting includes extracting the content data corresponding to the keyword from the user information when the word matches the keyword, and further extracting the content data similar to the predetermined condition information from the extracted content data.

27. The medium according to claim 22, wherein:
the data storage unit includes a data folder which is used by registered users and which stores one or a plurality of content data corresponding to each keyword; and
the processing of extracting includes extracting the content data corresponding to the keyword from the data folder when the word matches the keyword, and further extracting extracts content data most similar to condition information containing one or more of a sex, an age, an occupation, and a hobby from the extracted content data.

28. The medium according to claim 22, wherein the content data includes at least one of image data and sound data.

* * * * *